US012334636B2

(12) United States Patent
Samardzija et al.

(10) Patent No.: US 12,334,636 B2
(45) Date of Patent: Jun. 17, 2025

(54) COMPACT SPIRALED SLOT ANTENNA

(71) Applicant: PLUME DESIGN, INC., Palo Alto, CA (US)

(72) Inventors: Miroslav Samardzija, Mountain View, CA (US); Arthur Tung, San Jose, CA (US); Ming-Tsung Su, Taipei (TW); Liem Hieu Dinh Vo, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 0 days.

(21) Appl. No.: 18/536,892

(22) Filed: Dec. 12, 2023

(65) Prior Publication Data

US 2024/0128651 A1 Apr. 18, 2024

Related U.S. Application Data

(62) Division of application No. 17/520,832, filed on Nov. 8, 2021, now Pat. No. 11,881,623.

(51) Int. Cl.
*H01Q 13/18* (2006.01)
*H01Q 1/36* (2006.01)
*H01Q 13/16* (2006.01)

(52) U.S. Cl.
CPC ............... *H01Q 13/18* (2013.01); *H01Q 1/36* (2013.01); *H01Q 13/16* (2013.01)

(58) Field of Classification Search
CPC .. H01Q 5/00; H01Q 5/10; H01Q 5/30; H01Q 7/00; H01Q 13/10; H01Q 13/16; H01Q 13/18; H01Q 1/22; H01Q 1/2291; H01Q 1/36; H01Q 9/04; H01Q 9/0464; H01Q 21/20; H01Q 21/28
See application file for complete search history.

(56) References Cited

U.S. PATENT DOCUMENTS

2005/0237260 A1* 10/2005 Bancroft ................ H01Q 9/285 343/859
2012/0146853 A1* 6/2012 Chang ...................... H01Q 9/42 343/700 MS
2019/0089185 A1* 3/2019 Zhang ..................... H02J 50/27
(Continued)

FOREIGN PATENT DOCUMENTS

TW 201322549 A 6/2013

*Primary Examiner* — Thai Pham
(74) *Attorney, Agent, or Firm* — Nicholas Martin; Greenberg Traurig, LLP

(57) ABSTRACT

A wireless device with a slot antenna includes one or more heat spreaders, a PCB with vias to allow current to flow through the PCB, various components disposed on the PCB, and a slot antenna compliment. By layering the components, e.g., heat spreaders, PCB, slot antenna compliment, etc. one or more slot antennas are formed from these components as to integrate the slot antennas into the existing structure. The formed slot antenna is a spiraled shape as to reduce the overall footprint of the slot antenna while keeping the required quarter-wavelength total effective length of an open-slot antenna. The formed slot antenna is wide enough to allow the antenna to accommodate a wide bandwidth and may include a plurality of steps to further allow for tuning of the length of the slot antenna. The wireless device can further include a housing enclosing the internal components.

11 Claims, 18 Drawing Sheets

(56) References Cited

U.S. PATENT DOCUMENTS

| | | | | |
|---|---|---|---|---|
| 2019/0190115 | A1* | 6/2019 | Samardzija | H01Q 9/42 |
| 2019/0260112 | A1* | 8/2019 | Azad | H01Q 9/42 |
| 2023/0022192 | A1* | 1/2023 | Zhao | H01Q 13/103 |

* cited by examiner

COMPACT SPIRALED SLOT ANTENNA

This patent application claims the benefit of and is a divisional of U.S. patent application Ser. No. 17/520,832, filed Nov. 8, 2021, which is incorporated by reference herein in its entirety.

FIELD OF THE DISCLOSURE

The present disclosure generally relates to antenna systems and methods. More particularly, the present disclosure relates to a spiraled slot antenna for use in compact applications.

BACKGROUND OF THE DISCLOSURE

A conventional slot antenna includes a metal surface (a ground plate), usually a flat plate, with one or more holes or slots cut out. This plate and hole or slot is driven as an antenna by a driving frequency, the slot radiates electromagnetic waves in a way similar to a dipole antenna. A slot antenna can be considered as an inverse of a dipole antenna, as a dipole antenna includes a conductive linear element surrounded by free space, and a conventional slot antenna includes a linear slot of free space surrounded by a conductive plane. The shape and size of the slot, as well as the driving frequency, determine the radiation pattern and the bandwidth that the antenna is capable of producing. A slot antenna's advantages are its size, design simplicity, and convenient adaptation to mass production using either waveguide or Printed Circuit Board (PCB) technology. A first requirement for a slot antenna is an infinitely sized ground plane (conductor) or larger enough size compared to the wavelength (λ). A second requirement is that the slit/cut/slot is close to half-wavelength (λ/2) in length to enable radiation (resonance).

Various devices utilize antennas for wireless communication, such as wireless Access Points (APs), streaming media devices, laptops, tablets, and the like (collectively "wireless devices"). Further, the design trend for such devices is to make them more aesthetically pleasing and have more compact form factors. The length requirements for a slot antenna limits the number of slot antennas and wavelength capabilities implemented into such devices, thus introducing an obstacle in designing antenna units for compact devices.

BRIEF SUMMARY OF THE DISCLOSURE

In various embodiments, the present disclosure relates to a slot antenna in a compact wireless device. The slot antenna is constructed using various components already included in the wireless device, e.g., heat spreaders, Printed Circuit Board (PCB) Vias, etc. The slot antenna also includes various additional slot antenna compliment components. Also, the slot antenna of the present disclosure is spiraled as to reduce its overall footprint inside of the wireless device while maintaining the required effective length for the desired output wavelength, thus allowing for more slot antennas to be placed in the wireless device. The term "spiraled" is not meant to necessarily indicate the slot antenna is curved, but rather that it is located in multiple planes. That is, the compact slot antenna can have a length that extends to a height and then to another length, to another height, etc. Also, the relative terminology here is meant in a logical sense since length and height are all relative as the corresponding wireless device can be moved.

In an embodiment, a compact spiraled slot antenna includes a spiraled slot with dimensions that are less than one quarter of the desired output wavelength. The compact spiraled slot antenna is formed by the coupling of a plurality of components in a wireless device. The total effective length of the slot is about one quarter of the desired output wavelength. The slot comprises of an open end and a closed end. The slot is wide enough as to allow the compact spiraled slot antenna to have a wide bandwidth. The slot is adapted to have a frequency range of 5 GHz to 6 GHz, or 6 GHz to 7 GHz for a new WiFi 6E band. A secondary slot is adapted to cover a different frequency and is fed by the same source as the primary antenna, thus broadening the bandwidth. An elongated portion and a flange allows the compact spiraled slot antenna to be fed directly from a printed circuit board (PCB). The compact spiraled slot antenna may further include components mounted within the slot, the effects of having components mounted within the slot being compensated by adjusting dimensions of the slot and adjusting the location of the feeding point of the compact spiraled slot antenna. The compact spiraled slot antenna may further include one or more air steps or ground steps to tune the compact spiraled slot antenna.

In another embodiment, a wireless device includes one or more heat spreaders; one or more printed circuit boards (PCB's); an antenna compliment ring including portions of multiple antennas; and one or more compact spiraled slot antennas including a spiraled slot formed by the coupling of the one or more heat spreaders, the one or more printed circuit boards (PCB's), and the antenna compliment ring, the compact spiraled slot antennas having dimensions that are less than one quarter of the desired output wavelength. The total effective length of the slot is about one quarter of the desired output wavelength. The slot comprises of an open end and a closed end. The slot is wide enough as to allow the compact spiraled slot antenna to have a wide bandwidth. The wireless device further includes a secondary slot adapted to cover a different frequency and fed by the same source as the primary antenna, thus broadening the bandwidth. The antenna compliment ring further includes one or more elongated portions and flanges, allowing the one or more compact spiraled slot antennas to be fed directly from a printed circuit board (PCB). The wireless device further includes components mounted within the one or more slots, the effects of having components mounted within the slots being compensated by adjusting dimensions of the slots and adjusting the location of the feeding point of the one or more compact spiraled slot antennas. The wireless device further includes one or more air steps or ground steps to tune the compact spiraled slot antenna.

In a further embodiment, a wireless device with one or more slot antennas includes: one or more heat spreaders including multiple cavities which form portions of the one or more slot antennas; one or more printed circuit boards (PCB's) including a feeding mechanism and a plurality of via holes to allow electrical current to flow through the PCB; an antenna compliment ring including portions of multiple antennas; and one or more compact spiraled slot antennas including a spiraled slot formed by the coupling of the one or more heat spreaders, the one or more printed circuit boards (PCB's), and the antenna compliment ring, the compact spiraled slot antennas having dimensions that are less than one quarter of the desired output wavelength. The total effective length of the slot is about one quarter of the desired output wavelength.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to a slot antenna in a compact wireless device. The slot antenna is constructed using various components already included in the wireless device, e.g., heat spreaders, Printed Circuit Board (PCB) Vias, etc. The slot antenna also includes various additional slot antenna compliment components. Also, the slot antenna of the present disclosure is spiraled as to reduce its overall footprint inside of the wireless device while maintaining the required effective length for the desired output wavelength, thus allowing for more slot antennas to be placed in the wireless device. The term "spiraled" is not meant to necessarily indicate the slot antenna is curved, but rather that it is located in multiple planes. That is, the compact slot antenna can have a length that extends to a height and then to another length, to another height, etc. Also, the relative terminology here is meant in a logical sense since length and height are all relative as the corresponding wireless device can be moved.

A wireless device with a slot antenna includes one or more heat spreaders, a PCB with vias to allow current to flow through the PCB, various components disposed on the PCB, and a slot antenna compliment. By layering the components, e.g., heat spreaders, PCB, slot antenna compliment, etc. one or more slot antennas are formed from these components as to integrate the slot antennas into the existing structure. The formed slot antenna is a spiraled shape as to reduce the overall footprint of the slot antenna while keeping the required quarter-wavelength total effective length of an open-slot antenna. The formed slot antenna is wide enough to allow the antenna to accommodate a wide bandwidth and may include a plurality of steps to further allow for tuning of the length of the slot antenna. The wireless device can further include a housing enclosing the internal components.

Figure 1:
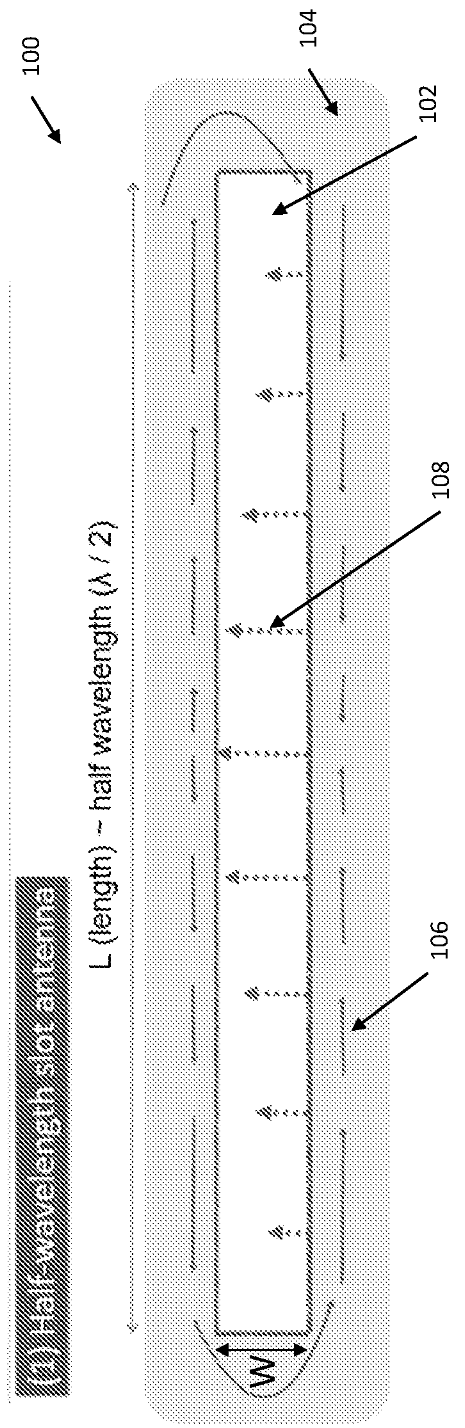
FIG. 1 is a diagram of a half-wavelength slot antenna.

FIG. 1 is a diagram of a half-wavelength slot antenna. The slot antenna 100 includes a slot 102 who's length L is about half ($\lambda/2$) of the of the wavelength $\lambda$, and a ground plane 104 which is large relative to the wavelength $\lambda$ of interest. The slot 102 includes a width W which is much less than the wavelength $\lambda$ and much less than the length L of the slot 102. An electric current 106 is shown traveling around the perimeter of the slot 102 and an electric field 108 is shown flowing across the slot 102. The electric current 106 is much stronger along the ends of the slot 102 and depicted by longer arrows, and the electric current 106 is considerably weaker towards the center of the slot 102 and represented by the shorter electric current 106 arrows. Inversely, the electric field 108 creates most of the radiation and is much stronger in the center of the slot 102 and much weaker towards the ends of the slot 102. The slot antenna 100 shown in FIG. 1 is a conventional half-wavelength slot antenna and takes up a considerable amount of space inside of a wireless device as there is a requirement for the extension of the length L in a single plane.

Figure 2:
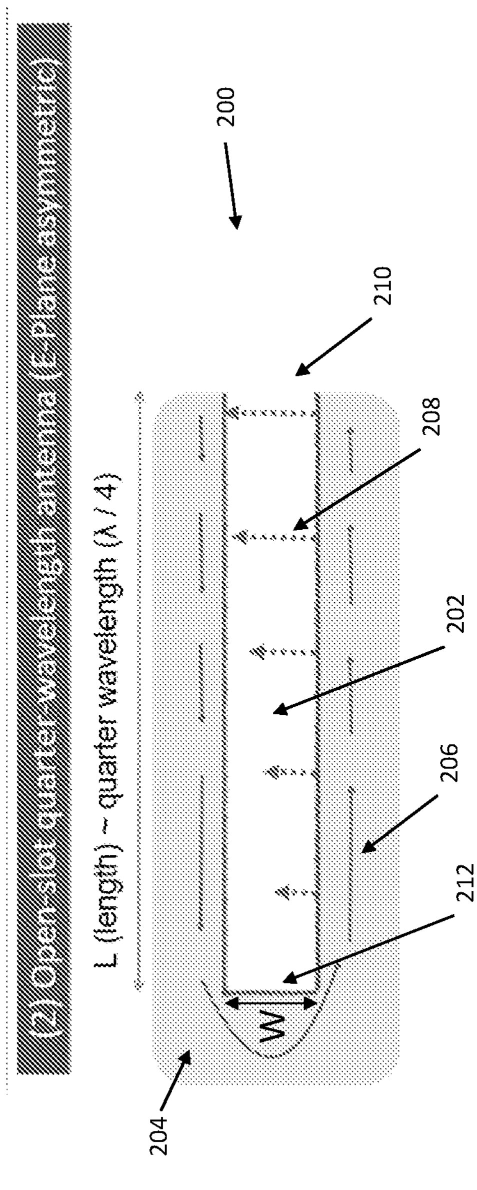
FIG. 2 is a diagram of an open-slot quarter-wavelength slot antenna.

FIG. 2 is a diagram of an open-slot quarter-wavelength slot antenna. The slot antenna 200 includes a slot 202 who's length L is about a quarter ($\lambda/4$) of the of the wavelength $\lambda$, and a ground plane 204 which is again large relative to the wavelength $\lambda$ of interest. The slot 202 includes a width W which is much less than the wavelength $\lambda$ and much less than the length L of the slot 202. The open-slot quarter-wavelength slot antenna includes an open end 210. Due to symmetry, the open-slot antenna can have a length L that is one quarter of the wavelength $\lambda$ and still maintain similar performance. An electric current 206 is again shown traveling around the perimeter of the slot 202 and an electric field 208 is shown flowing across the slot 202. The electric current 206 is much stronger along the closed end 212 (shorting end) of the slot 202 and depicted by longer arrows, and the electric current 206 is considerably weaker towards the open end 210 of the slot 202 and represented by the shorter electric current 206 arrows. Inversely, the electric field 208 creates most of the radiation and is much stronger at the open end 210 of the slot 202 and much weaker towards the closed end 212 of the slot 202. The slot antenna 200 shown in FIG. 2 is a conventional open-slot quarter-wavelength slot antenna and still takes up a considerable amount of space inside of a wireless device.

Figure 3:
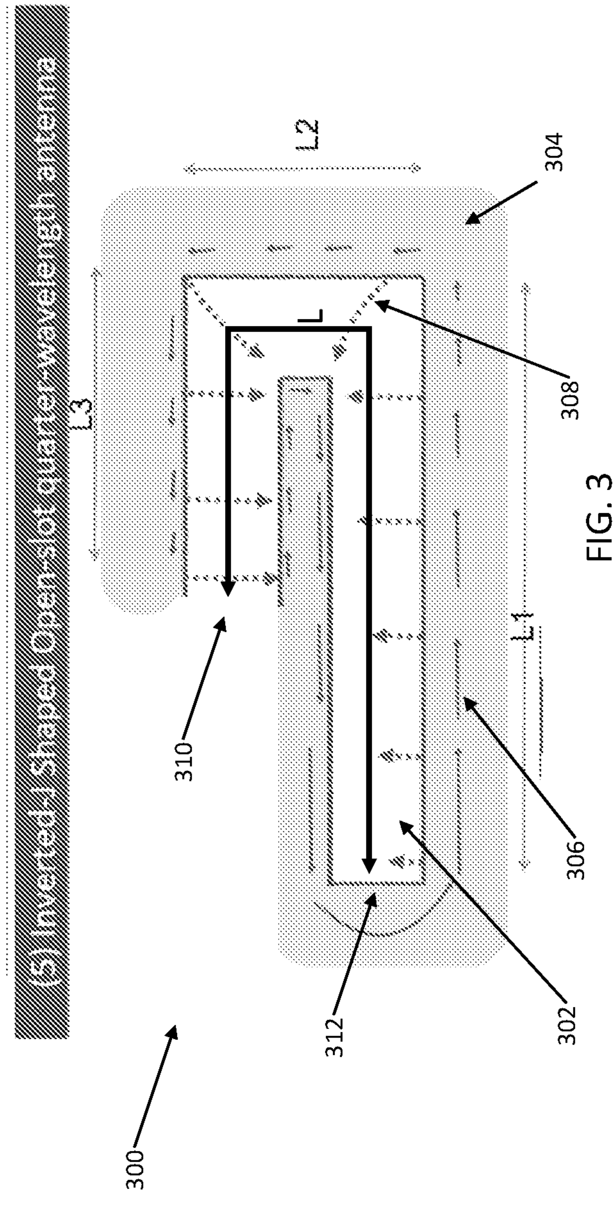
FIG. 3 is a diagram of a spiraled open-slot quarter-wavelength slot antenna.

FIG. 3 is a diagram of a spiraled open-slot quarter-wavelength slot antenna. Again, the term "spiraled" is not meant to necessarily indicate the slot antenna is curved, but rather that it is located in multiple planes. That is, the compact slot antenna can have a length that extends to a height and then to another length, to another height, etc. as to reduce the overall dimensions of the antenna while maintaining a necessary overall slot length. Also, the relative terminology here is meant in a logical sense since length and height are all relative as the corresponding wireless device can be moved. This slot antenna 300 includes a slot 302 that is bent over itself in a spiraled manner, again showing the slot 302 being located in multiple planes and having a plurality of lengths which make up a total length L. It will be appreciated that the plurality of lengths L may extend in any direction and any plane as to create a continuous slot 302. The total length L of the slot 302 of the spiraled open-slot antenna is about a quarter of the wavelength λ as it was for the non-spiraled open-slot antenna of FIG. 2. Because of the slot being spiraled, the overall length of the antenna is much smaller than a conventional open-slot antenna, thus taking up much less space inside of a wireless device. A ground plane 304, which is again large relative to the wavelength λ of interest, is disposed around the slot 302. The slot 302 includes a length L (i.e., total effective length) which is the sum of all lengths (L1, L2, and L3) and a width W which is much less than the wavelength λ and much less than the length L of the slot 302. Again, the lengths (L1, L2, and L3) may extend in any direction and in any plane, creating any configuration. It will also be appreciated that any number of lengths (L1, . . . , Ln) may be used to create the slot 302. The spiraled open-slot quarter-wavelength slot antenna includes an open end 310. Due to symmetry, the open-slot antenna can have a total length L that is one quarter of the wavelength λ and still maintain similar performance of a conventional half-wavelength slot antenna. An electric current 306 is again shown traveling around the perimeter of the slot 302 and an electric field 308 is shown flowing across the slot 302. The electric current 306 is much stronger along the closed end 312 (shorting end) of the slot 302 and depicted by longer arrows, and the electric current 306 is considerably weaker towards the open end 310 of the slot 302 and represented by the shorter arrows. Inversely, the electric field 308 creates most of the radiation and is much stronger at the open end 310 of the slot 302 and much weaker towards the closed end 312 of the slot 302. Because the total effective length L of the open slot antenna 300 is still one quarter of the wavelength λ, and the slot is spiraled over itself, the overall footprint of the spiraled open-slot antenna is much smaller than a conventional open-slot antenna. This allows more of these antennas to be placed in a wireless device while maintaining a small form factor.

Figure 4:
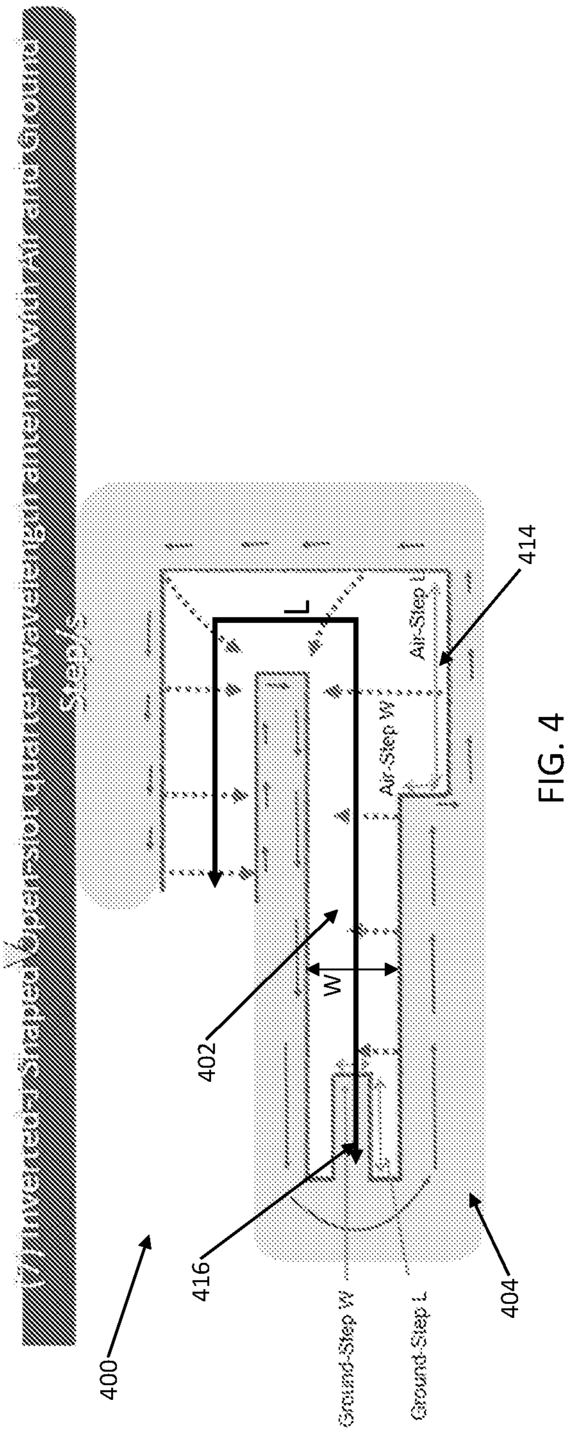
FIG. 4 is a diagram of a spiraled open-slot quarter-wavelength slot antenna with a plurality of steps.

FIG. 4 is a diagram of a spiraled open-slot quarter-wavelength slot antenna with a plurality of steps. The spiraled open-slot antenna 400 includes a plurality of steps, the steps being air-steps 414 and ground-steps 416. These steps are introduced to allow the slot antenna 400 to be tuned, thus tuning the resonance of the antenna 400. When these steps are introduced, they change the effective length L and/or width W of the antenna 400 and in turn change the radiating characteristics of the antenna 400. An air-step is characterized by an extra cut out section in the slot 402, increasing the effective length L and/or width W of the slot. A ground-step is an extension of the ground plane 404 protruding into the slot 402, decreasing the effective length L and/or width W of the slot 402.

Figure 5:
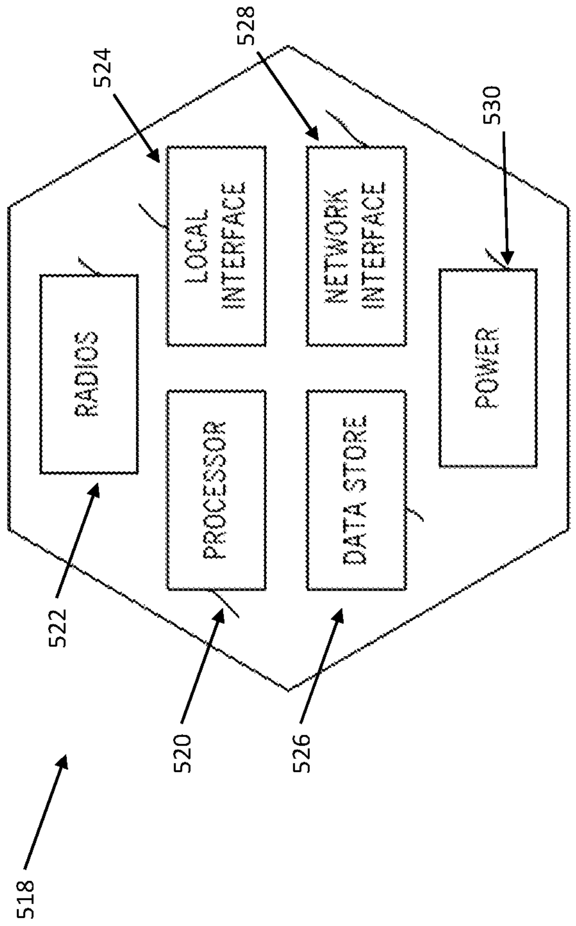
FIG. 5 is a block diagram of functional components of a wireless access point as an example wireless device implementing the slot antenna described herein.

FIG. 5 is a block diagram of functional components of a wireless access point as an example wireless device implementing the slot antenna described herein. The access point 518 contains a processor 520, a plurality of radios 522, a local interface 524, a data store 526, a network interface 528, and power 530. It should be appreciated by those of ordinary skill in the art that FIG. 5 depicts the access point 518 in an oversimplified manner, and a practical embodiment may include additional components and suitably configured processing logic to support features described herein or known or conventional operating features that are not described in detail herein.

The processor 520 is a hardware device for executing software instructions. The processor 520 can be any custom made or commercially available processor, a central processing unit (CPU), an auxiliary processor among several processors, a semiconductor-based microprocessor (in the form of a microchip or chip set), or generally any device for executing software instructions. When the access point 518 is in operation, the processor 520 is configured to execute software stored within memory or the data store 526, to communicate data to and from the memory or the data store 526, and to generally control operations of the access point 518 pursuant to the software instructions. In an embodiment, the processor 520 may include a mobile-optimized processor such as optimized for power consumption and mobile applications.

The radios 522 enable wireless communication. The radios 522 can operate according to the IEEE 802.11 standard. The radios 522 include address, control, and/or data connections to enable appropriate communications on a Wi-Fi system. As described herein, the access point 518 includes a plurality of radios to support different links, i.e., backhaul links and client links. Also, the radios 522 can include a Bluetooth interface as well for local access, control, onboarding, etc. The radios 522 contemplate using the spiraled slot antenna structure described herein.

The local interface 524 is configured for local communication to the access point 518 and can be either a wired connection or wireless connection such as Bluetooth or the like. Since the access point 518 can be configured via the cloud, an onboarding process is required to first establish connectivity for a newly activated access point 518. In an embodiment, the access point 518 can also include the local interface 524 allowing connectivity to a user device for onboarding to a Wi-Fi system such as through an app on the user device. The data store 526 is used to store data. The data store 526 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 526 may incorporate electronic, magnetic, optical, and/or other types of storage media.

The network interface 528 provides wired connectivity to the access point 518. The network interface 528 may be used to enable the access point 518 communicate to a modem/router. Also, the network interface 528 can be used to provide local connectivity to a user device. For example, wiring in a device to an access point 518 can provide network access to a device which does not support Wi-Fi. The network interface 528 may include, for example, an Ethernet card or adapter (e.g., 10BaseT, Fast Ethernet, Gigabit Ethernet, 10 GbE). The network interface 528 may include address, control, and/or data connections to enable appropriate communications on the network. The processor 520 and the data store 526 can include software and/or firmware which essentially controls the operation of the access point 518, data gathering and measurement control, data management, memory management, and communication and control interfaces with the cloud.

Figure 6:
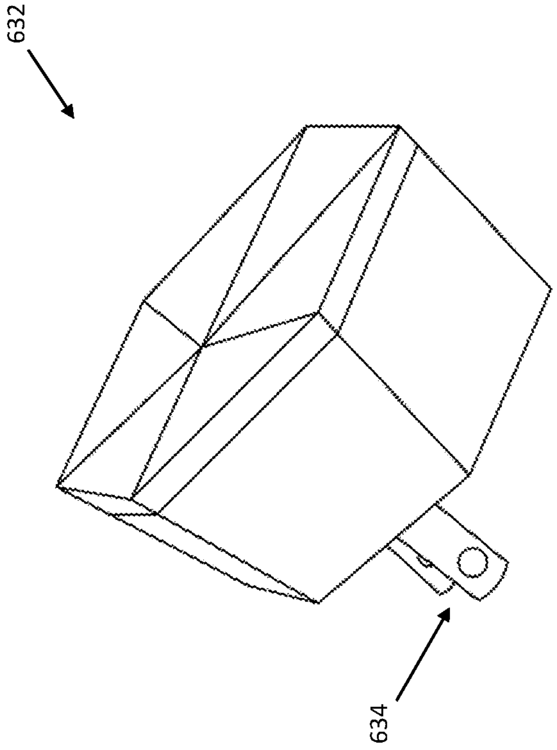
FIG. 6 is a perspective diagram of a physical form factor for the wireless access point.

FIG. 6 is a perspective diagram of a physical form factor 632 for a wireless access point. The physical form factor 632 includes electrical plugs 634 to allow the wireless access point to be plugged into a wall outlet. The dimensions of the wireless device are small such that a plurality of conventional slot antennas 100 (FIG. 1) and/or open-slot antennas 200 (FIG. 2) are not able to be placed inside of the wireless device. The compact spiraled slot antenna of the present disclosure is small enough to allow for a plurality to be placed in small form factor wireless devices such as the physical form factor 632 depicted in FIG. 6.

Figure 7:
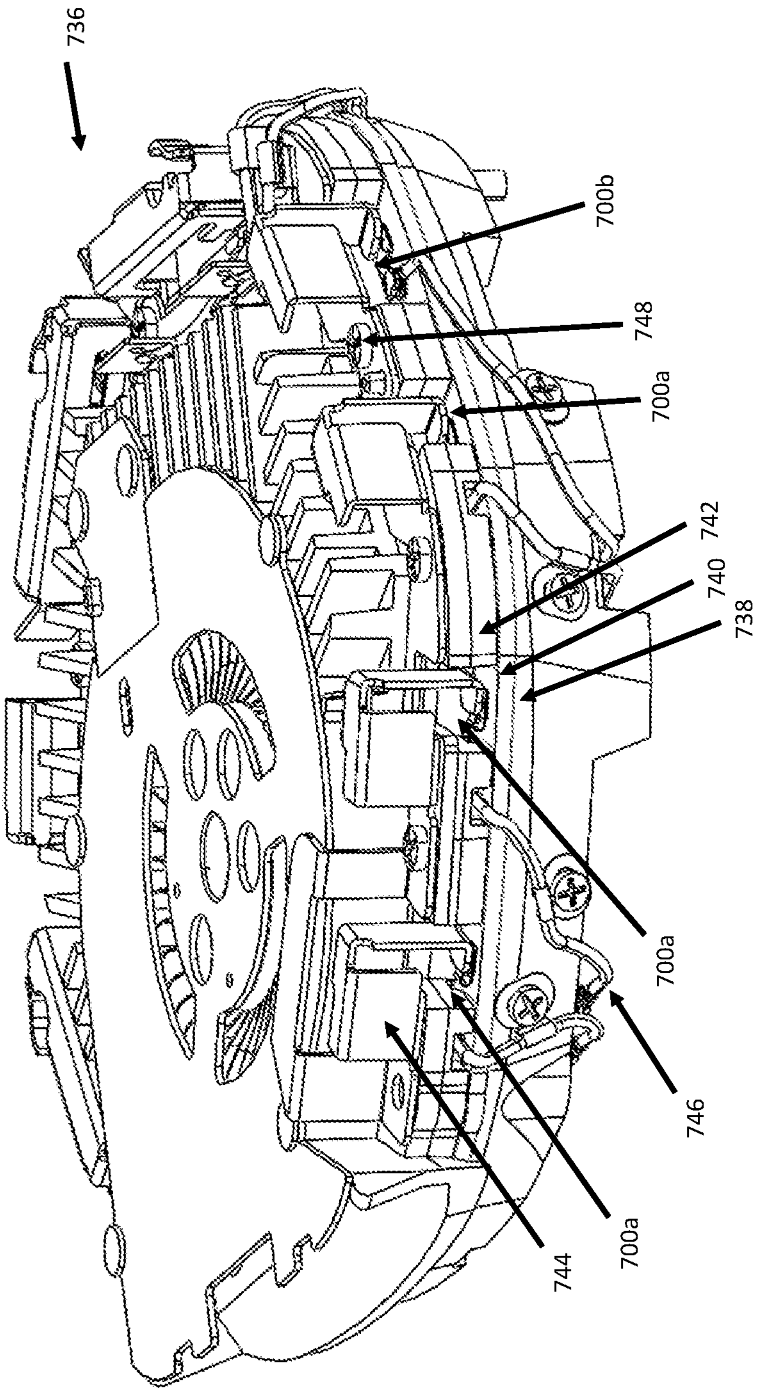
FIG. 7 is a perspective diagram of the inner components of an example wireless device implementing the compact spiraled slot antenna described herein.

FIG. 7 is a perspective diagram of the inner components 736 of an example wireless device implementing the compact spiraled slot antennas 700*a* and 700*b* described herein. The inner components 736 of an example wireless device include a lower heat spreader 738, a Printed Circuit Board (PCB) 740, an upper heat spreader 742, and an antenna compliment ring 744. Other components such as coaxial cables 746 and screws 748 are also disposed along the inner components 736.

The compact spiraled slot antennas 700*a* and 700*b* are formed by the combination of components including the antenna compliment ring 744, plurality of heat spreaders 738 and 742, and the PCB 740. The combination of these components create a slot which acts as the compact spiraled slot antenna 700*a* and 700*b*. The current flows around the slot and through the PCB by way of via holes (described further herein) to create an electric field, thus allowing the spiraled slot antenna to radiate. The compact spiraled slot antennas 700*a* and 700*b* are tuned to allow a wide range of bandwidth, for example 5 GHz to 6 GHz, although not limited to such frequencies.

The components such as the lower heat spreader 738, PCB 740, upper heat spreader 742, and antenna compliment ring 744 are fixedly attached to one another via screws 748 or other suitable attachment methods known to one of ordinary skill in the art. It will be appreciated that the compact spiraled slot antennas 700*a* and 700*b* may be formed using any other conductive or nonconductive components, such nonconductive components having an electrical current bridge such as via holes. The components shown in FIG. 7 shall be construed as a non-limiting example.

Figure 8:
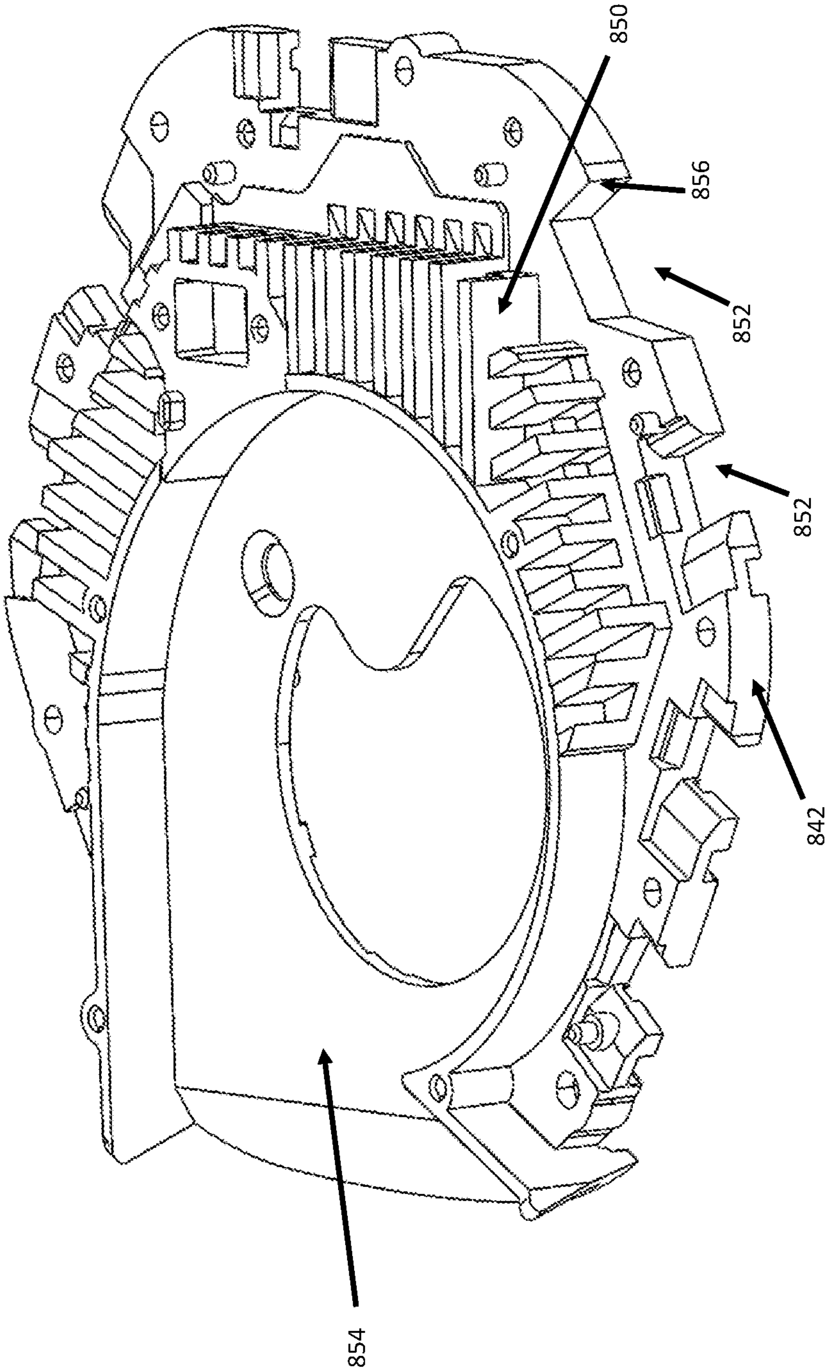
FIG. 8 is a side perspective diagram of the upper heat spreader of an example wireless device implementing the compact spiraled slot antenna described herein.

FIG. 8 is a front perspective diagram of the upper heat spreader 842 of an example wireless device implementing the compact spiraled slot antenna described herein. The upper heat spreader 842 includes cooling fins 850, and a plurality of cavities 852 of varying sizes to accommodate the different spiraled slot antennas 700*a* and 700*b* (FIG. 7). A hollowed space 854 is disposed on the surface of the upper heat spreader 842 to accommodate a cooling fan or other active cooling mechanism known in the art.

The cavities 852 are arranged along the outer circumference of the upper heat spreader 842. The cavities 852 are adapted to both allow the antenna compliment ring, described further herein, to extend down into the cavities and be positioned above the PCB which is disposed below the upper heat spreader 842. The cavities 852 include slot edges 856 which make up a portion of the slot when the components are fixed together.

Figure 9:
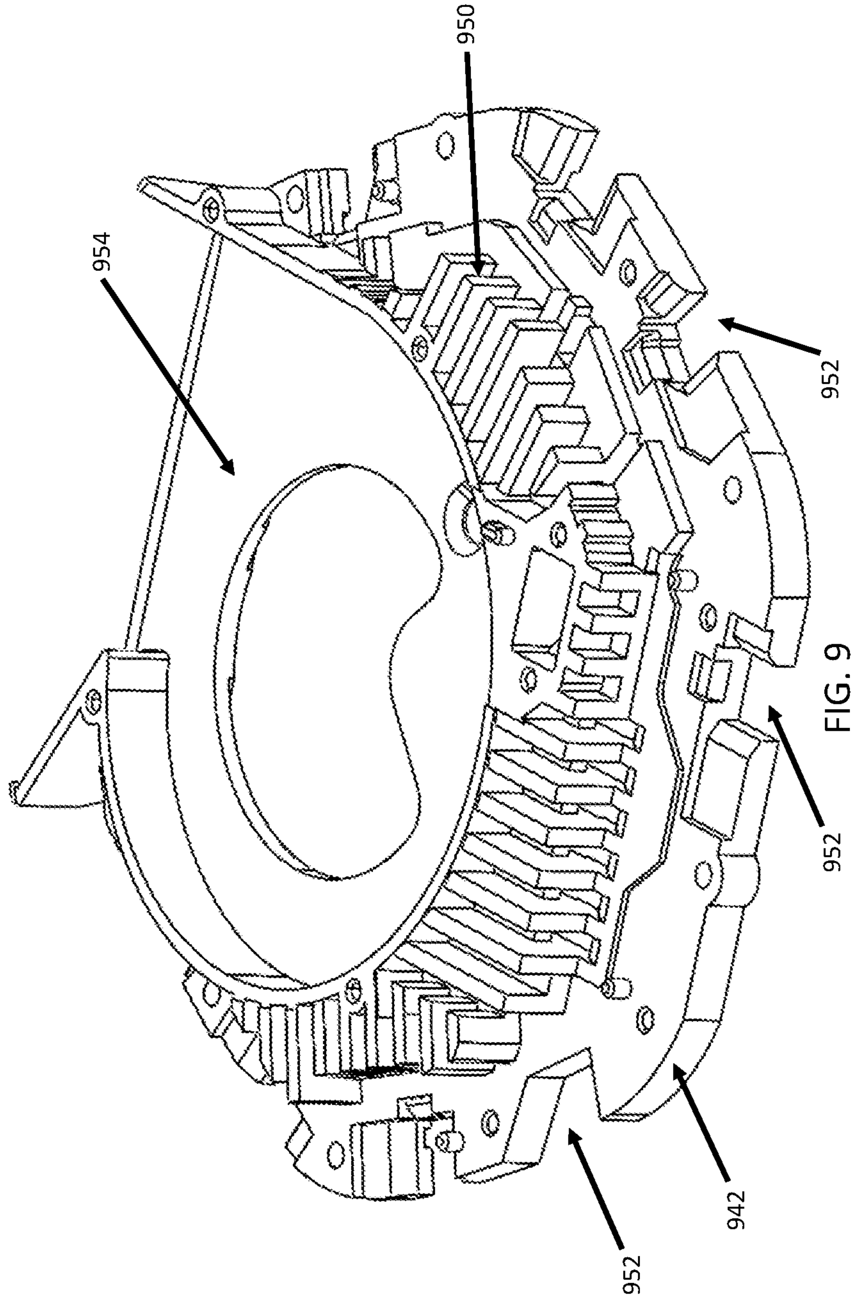
FIG. 9 is a front perspective diagram of the upper heat spreader of an example wireless device implementing the compact spiraled slot antenna described herein.

FIG. 9 is a side perspective diagram of the upper heat spreader 942 of an example wireless device implementing the compact spiraled slot antenna described herein. The upper heat spreader 942 again includes cooling fins 950, a plurality of cavities 952 of varying sizes to accommodate the different spiraled slot antennas 700*a* and 700*b* (FIG. 7), and a hollowed space 954. The cavities 952 can be seen disposed along the entire edge of the upper heat spreader 942 and can poses different dimensions and shapes.

Figure 10:
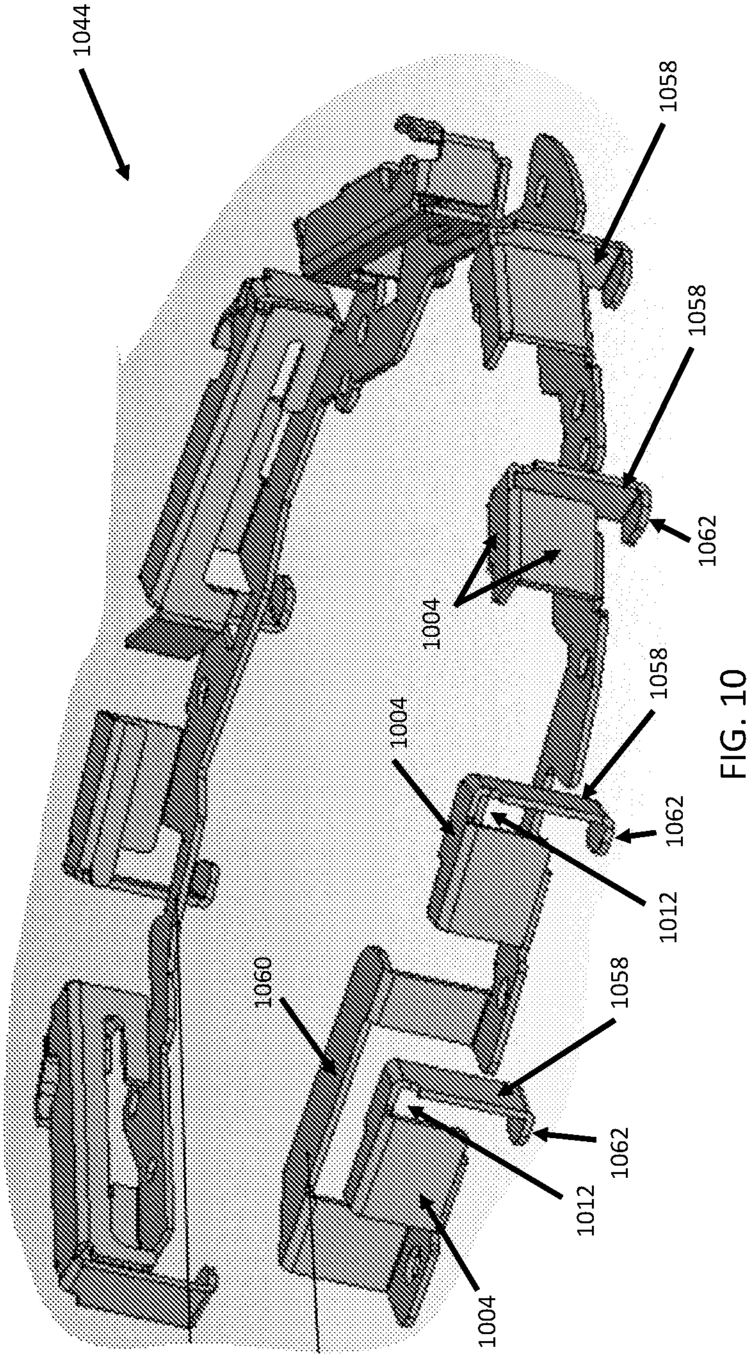
FIG. 10 is a perspective diagram of the antenna compliment ring of an example wireless device implementing the compact spiraled slot antenna described herein.

FIG. 10 is a perspective diagram of the antenna compliment ring 1044 of an example wireless device implementing the compact spiraled slot antenna described herein. The antenna compliment ring 1044 includes various ground planes 1004, elongate portions 1058, and bridge members 1060. The elongate portions 1058 further include flanges 1062 which act as a feeding point for the compact spiraled slot antenna. The antenna compliment ring 1044 forms a plurality of closed ends (shorting ends) 1012 which make up the closed ends of the plurality of compact spiraled slot antennas when the various components 736 (FIG. 7) are assembled.

The ground planes 1004 are adapted to emulate an infinite ground sheet as is called for by a slot antenna. The various ground planes 1004 extend from the edges of the compact spiraled slot antennas and may extend straight or be folded to conserve space. The various ground planes 1004 are large enough as to allow the compact spiraled slot antenna to have adequate performance while conserving space inside of the wireless device. One or more bridge members 1060 are adapted to link the plurality of ground planes 1004 and elongate portions 1058, allowing the antenna compliment ring 1044 to be installed as one single component.

The elongate portions 1058 extend to create a slot, described further herein, and provide a feeding point via the flanges 1062. The flanges 1062 are adapted to be positioned in relation to a PCB as to receive a feeding mechanism from the PCB such as a spring clip 1164 (FIG. 11) or other connection of the like. The flange 1062 being positioned as to allow the compact spiraled slot antenna to be fed at its most optimal location.

Figure 11:
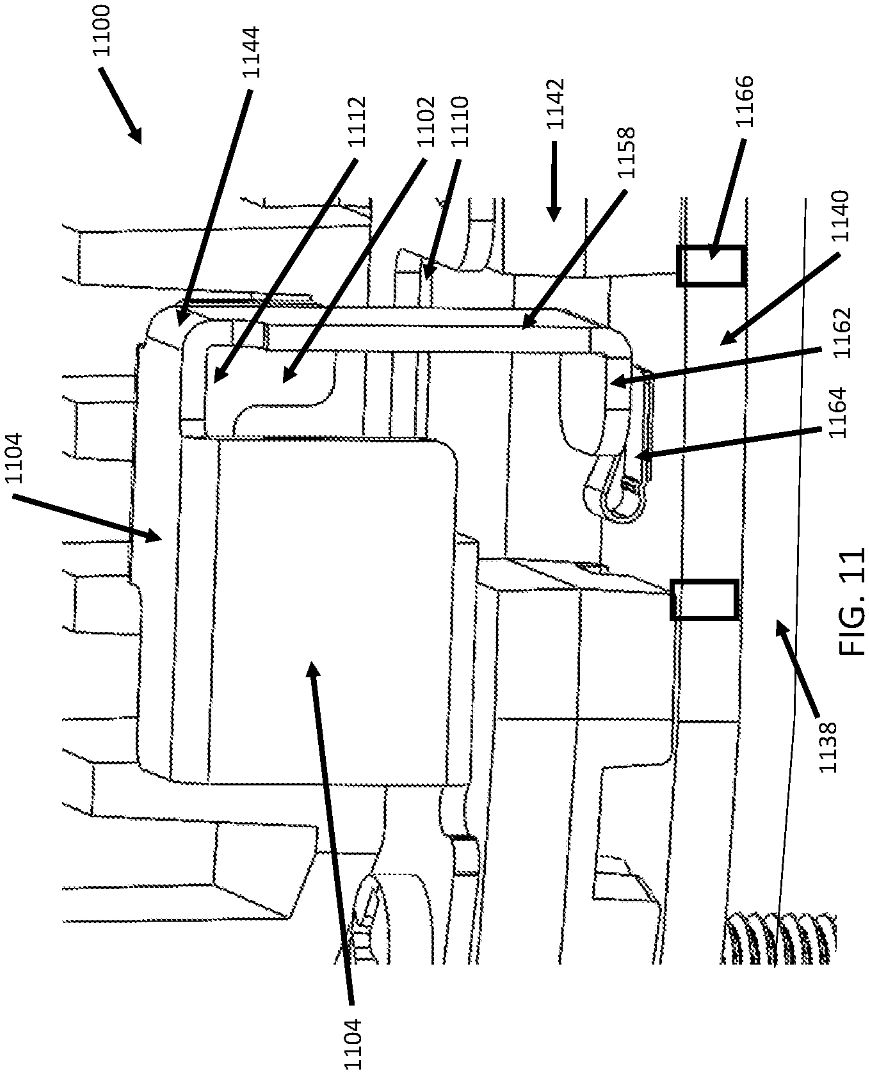
FIG. 11 is a perspective diagram of the compact spiraled slot antenna of an example wireless device of the present disclosure.

FIG. 11 is a perspective diagram of the compact spiraled slot antenna 1100 of an example wireless device of the present disclosure. The assembled components including the lower heat spreader 1138, the PCB 1140, the upper heat spreader 1142, and the antenna compliment ring 1144 form the slot 1102 of the compact spiraled slot antenna 1100. The slot 1102 may include a plurality of lengths (L1, L2, and L3) as shown in FIG. 3 creating the total length L of the slot. That is, the compact slot antenna can have a length that extends to a height and then to another length, to another height, etc. as to reduce the overall dimensions of the antenna while maintaining a necessary overall slot length. Also, the relative terminology here is meant in a logical sense since length and height are all relative as the corresponding wireless device can be moved. Again, showing the slot 1102 being located in multiple planes and having a plurality of lengths which make up a total length L. It will be appreciated that the plurality of lengths L may extend in any direction and any plane as to create a continuous slot 1102. The slot includes an open end 1110 and a closed end 1112 (shorting end) making it perform as an open slot antenna. The various components such as the lower heat spreader 1138, the PCB 1140, the upper heat spreader 1142, and the antenna compliment ring 1144 act as the ground plane 1104 of the antenna. A plurality of via holes 1166 are disposed through the PCB 1140 to allow the current to flow to the lower heat spreader 1138.

The elongate portion 1158 extends into the cavity 952 (FIG. 9) formed in the upper heat spreader 1142, thus causing the slot 1102 to bend (spiral) similar to the open-slot antenna of FIG. 3 and FIG. 4. The total length of the slot

1102 of the compact spiraled slot antenna 1100 is about a quarter of the wavelength λ. Because of the slot 1102 being spiraled, the overall length of the antenna is much smaller than a conventional open-slot antenna, thus taking up much less space inside of a wireless device. The elongate portion includes a flange 1162 with which the compact spiraled slot antenna 1100 is fed by a spring clip 1164 or other means of electrical connection of the like such as a screw or solder joint. The flange 1162 being positioned as to allow the compact spiraled slot antenna 1100 to be fed at its most optimal location.

The via holes 1166 allow the slot 1102 to extend down to the lower heat spreader 1138 thus widening the slot 1102. The electric current flows around the perimeter of the slot 1102 and an electric field flows across the slot 1102. The electric current is much stronger along the closed end 1112 (shorting end) of the slot 1102 and the electric current is considerably weaker towards the open end 1110 of the slot 1102. Inversely, the electric field creates most of the radiation and is much stronger at the open end 1110 of the slot 1102 and much weaker towards the closed end 1112 of the slot 1102. Because the total effective length L of the compact spiraled slot antenna 1100 is still about one quarter of the wavelength λ, and the slot is spiraled over itself, the overall footprint of the compact spiraled slot antenna 1100 is much smaller than a conventional open-slot antenna 200 (FIG. 2). This allows more antennas to be placed in a wireless device while maintaining a small form factor. The slot 1102 is adapted to be wide enough to accommodate a wide range of bandwidth, for example, around 5 GHz to 6 GHz, or 6 GHz to 7 GHz for the new WiFi 6E band in some embodiments.

Figure 12:
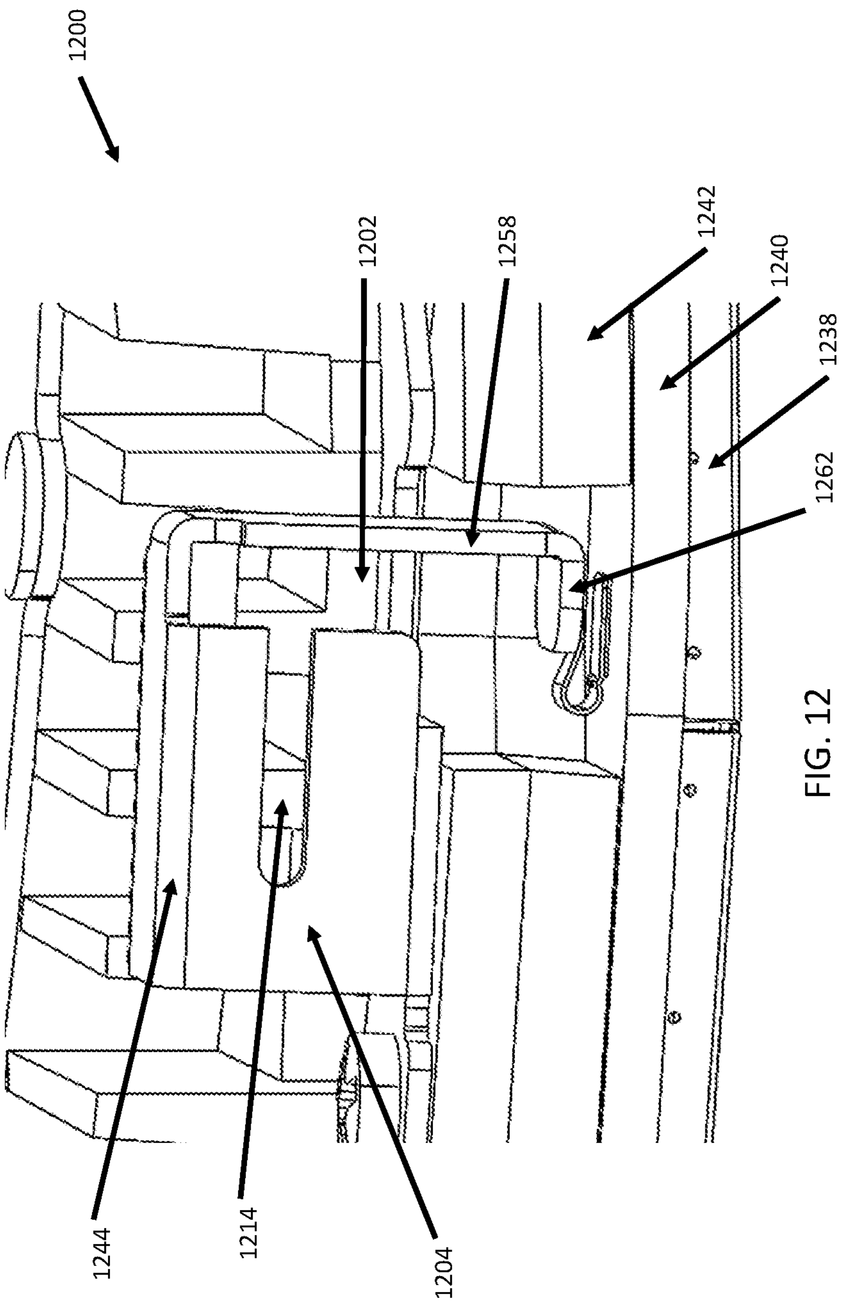
FIG. 12 is a perspective diagram of the compact spiraled slot antenna of an example wireless device of the present disclosure, the compact spiraled slot antenna including steps.

FIG. 12 is a perspective diagram of the compact spiraled slot antenna 1200 of an example wireless device of the present disclosure, the compact spiraled slot antenna 1200 including steps. The compact spiral slot antenna is again formed by the assembly of various components including the lower heat spreader 1238, the PCB 1240, the upper heat spreader 1242, and the antenna compliment ring 1244, all of which form the slot 1202 of the compact spiraled slot antenna 1100.

The antenna compliment ring 1244 includes the elongated portion 1258 which further includes the flange 1262. The antenna complement ring 1244 of the present illustrated embodiment further includes an air step 1214. The air step 1214 is disposed in the ground plane 1204 and sized as to tune the length and/or width of the slot 1202, thus tuning the antenna for a particular resonance.

Figure 13:
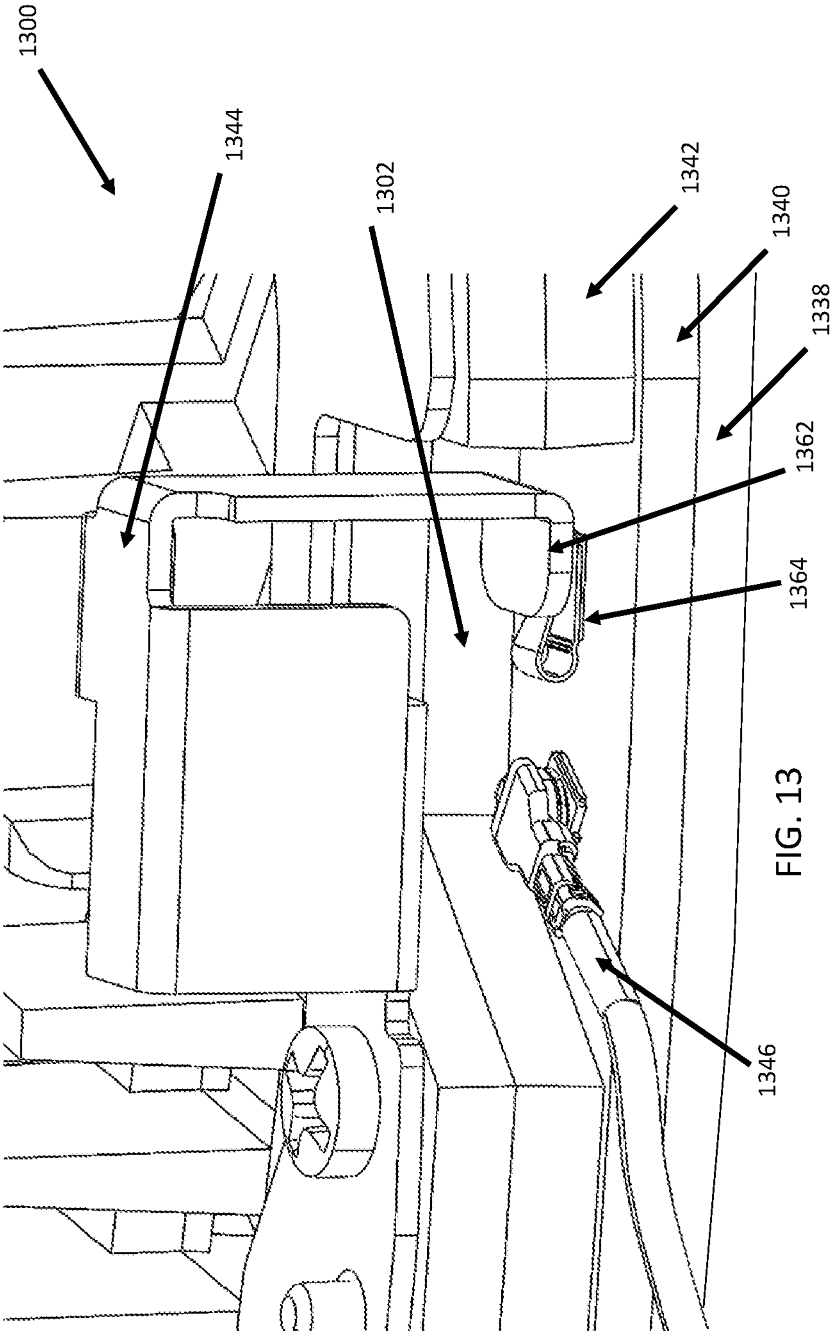
FIG. 13 is a perspective diagram of the compact spiraled slot antenna of an example wireless device of the present disclosure, the compact spiraled slot antenna having components therein.

FIG. 13 is a perspective diagram of the compact spiraled slot antenna 1300 of an example wireless device of the present disclosure, the compact spiraled slot antenna 1300 having components therein. As in previous illustrated embodiments, the compact spiral slot antenna 1300 is again formed by the assembly of various components including the lower heat spreader 1338, the PCB 1340, the upper heat spreader 1342, and the antenna compliment ring 1344, all of which form the slot 1302 of the compact spiraled slot antenna 1300. A coaxial cable 1346 is disposed through of the slot 1302 of the compact spiraled slot antenna 1300 of the present illustrated embodiment. The cavity 952 (FIG. 9) is sized as to accommodate the coaxial cable 1346, allowing the coaxial cable 1346 and/or other electrical components to be electrically coupled to the PCB 1340 inside of the slot 1302.

The compact spiral slot antenna 1300 is tuned, by way of sizing the slot and/or moving the location of the feeding point, i.e., the location of the spring clip 1364 and flange 1362. The slot 1302 is tuned to cancel out any disturbance caused by the introduction of the coaxial cable 1346 in the slot 1302. The compact spiraled slot antenna 1300 of the present embodiment may also use a matching network to cancel out any impact introduced by components such as the coaxial cable 1346 disposed through the slot 1302. This configuration allows the compact spiraled slot antenna 1300 to radiate while also carrying its own feed.

Figure 14:
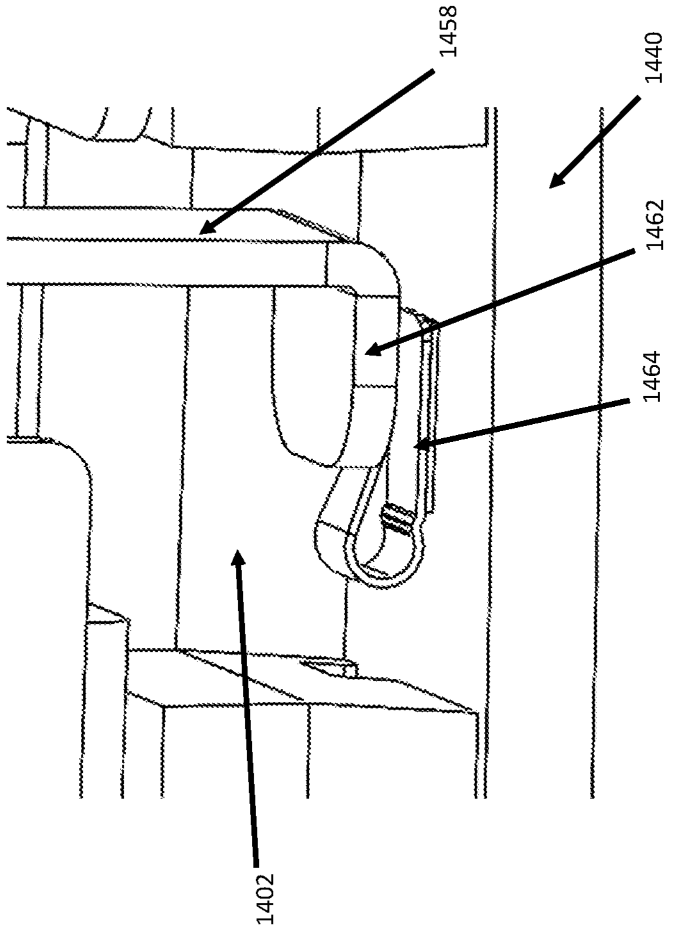
FIG. 14 is a perspective diagram of the elongate portion of the compact spiraled slot antenna of an example wireless device of the present disclosure.

FIG. 14 is a perspective diagram of the elongated portion 1458 of the compact spiraled slot antenna of an example wireless device of the present disclosure. The elongated portion 1458 and flange 1462 act as both the perimeter of the slot 1402 and as a feeding point for the compact spiraled slot antenna of the present disclosure. The flange 1462 makes contact with a spring clip 1464 which feeds the antenna via the PCB 1440. The spring clip 1464 may be replaced by any other form of electrical connection such as a screw, solder joint, or other connection of the like. In various embodiments the flange 1462 may also make direct contact with the PCB 1440 to electrically couple and feed the compact spiraled slot antenna.

Figure 15:
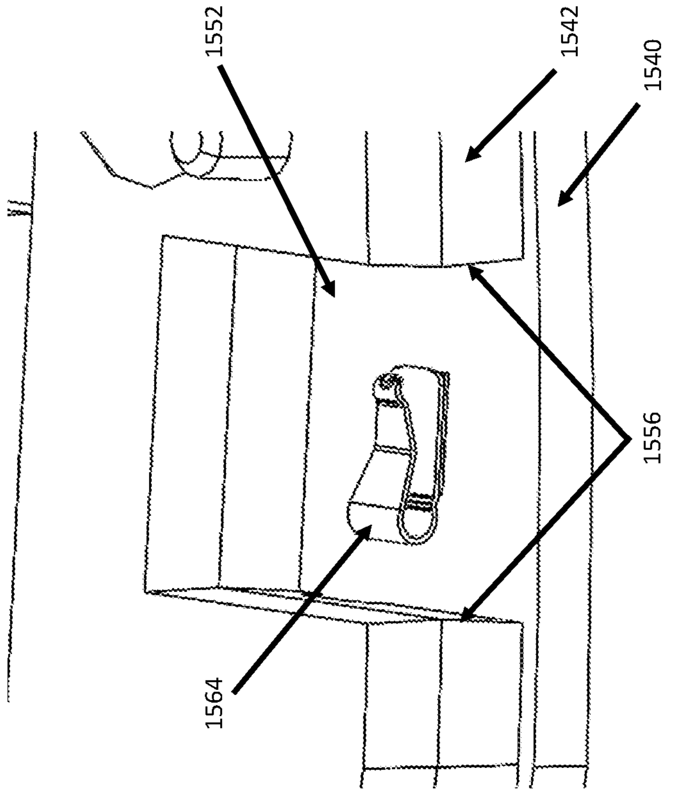
FIG. 15 is a perspective diagram of the feeding clip and cavity of the compact spiraled slot antenna of an example wireless device of the present disclosure.

FIG. 15 is a perspective diagram of the spring clip 1564 and cavity 1552 of the compact spiraled slot antenna of an example wireless device of the present disclosure. A plurality of cavities 1552 are arranged along the outer circumference of the upper heat spreader 1542. The cavities 1552 are adapted to both allow the antenna compliment ring 744 (FIG. 7), described further herein, to extend down into the cavities 1552 and be positioned above the PCB 1540 which is disposed below the upper heat spreader 1542. The cavities 1552 are sized to accommodate various embodiments of the compact spiraled slot antenna, for example, allowing room for components such as coaxial cables to be disposed on the PCB 1540 inside of the cavities 1552. The cavities 1552 include slot edges 1556 which make up a portion of the slot when various components are fixed together. The spring clip 1564 contacts the flange (not shown) to feed the compact spiraled slot antenna from the PCB 1540. The spring clip 1564 may be replaced by any other form of electrical connection such as a screw, solder joint, or other connection of the like.

Figure 16:
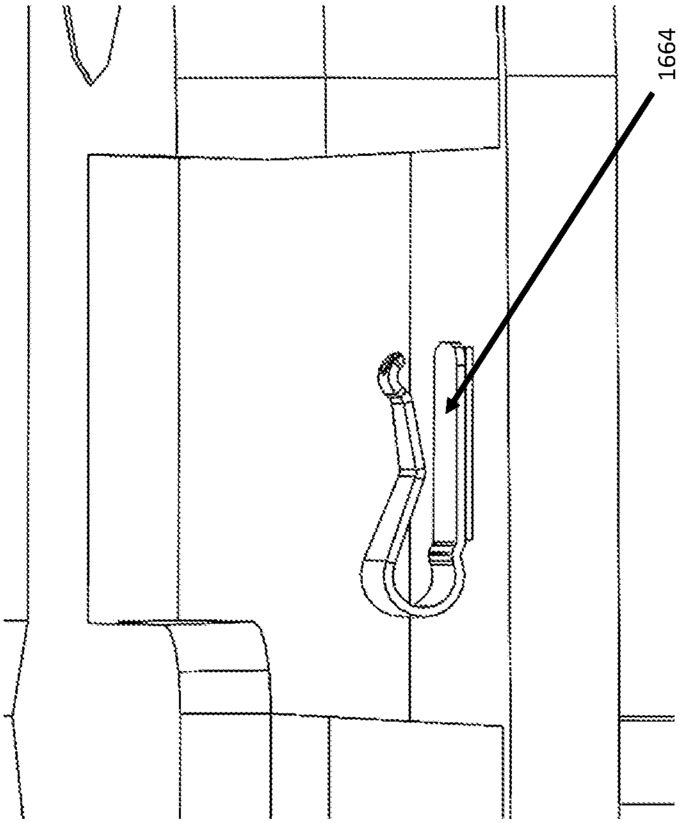
FIG. 16 is a side perspective diagram of the feeding clip of the compact spiraled slot antenna of an example wireless device of the present disclosure.

FIG. 16 is a side perspective diagram of the spring clip 1664 of the compact spiraled slot antenna of an example wireless device of the present disclosure. The spring clip 1664 may be replaced by any other form of electrical connection such as a screw, solder joint, or other connection of the like. The present illustrated embodiment including the spring clip 1664 shall be construed as a non-limiting example.

Figure 17:
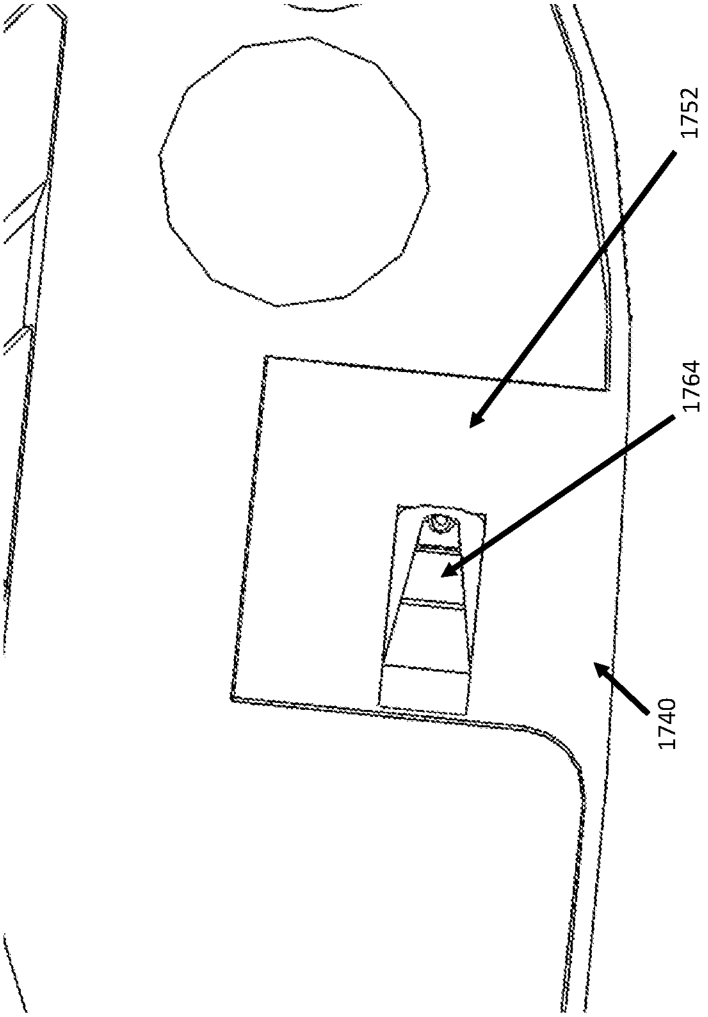
FIG. 17 is a top perspective diagram of the feeding clip and cavity of the compact spiraled slot antenna of an example wireless device of the present disclosure.

FIG. 17 is a top perspective diagram of the spring clip 1764 and cavity 1752 of the compact spiraled slot antenna of an example wireless device of the present disclosure. The cavities 1752 are sized to accommodate various embodiments of the compact spiraled slot antenna, for example, allowing room for components such as coaxial cables to be disposed on the PCB 1740 inside of the cavities 1752.

Figure 18:
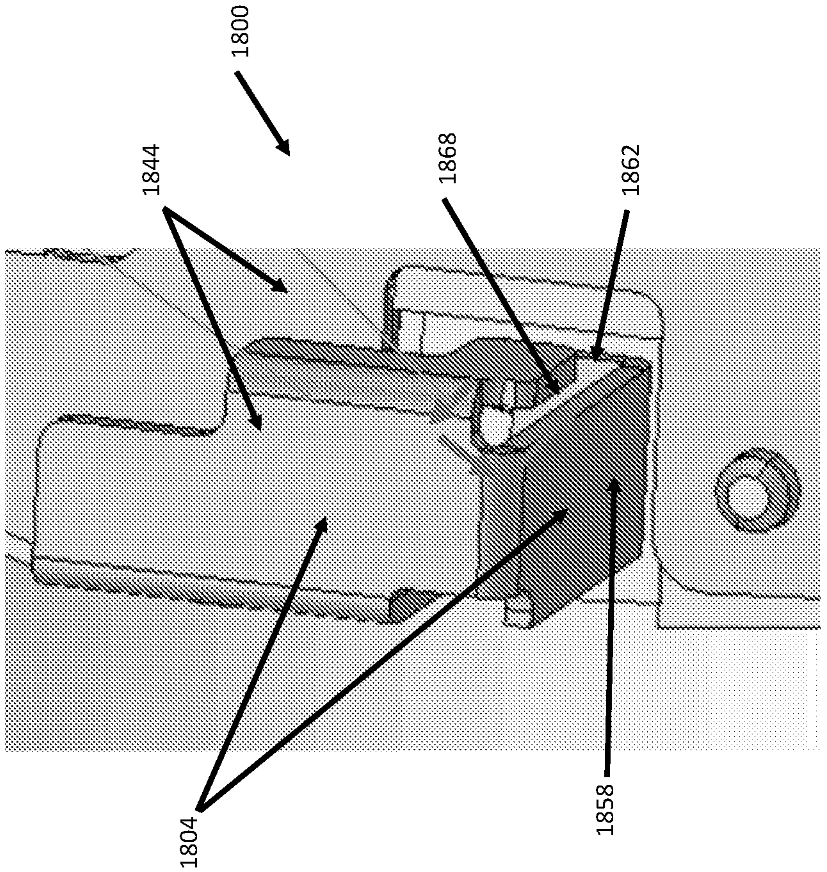
FIG. 18 is a top perspective diagram of the antenna compliment ring of the compact spiraled slot antenna of the present disclosure.

FIG. 18 is a top perspective diagram of the compact spiraled slot antenna 1800 of an example wireless device of the present disclosure. The top portion of the antenna compliment ring 1844 includes the ground planes 1804 which may be in plane with the slot of the antenna or bent. A secondary slot 1868 is formed by the various bent portions of the ground planes 1804. The secondary slot 1868 can be fed through the same elongated portion 1858 and flange 1862 used by the compact spiraled slot antenna of the present disclosure. The secondary slot 1868 may be a different length than the primary antenna (compact spiraled slot antenna) thus allowing additional frequencies to be radiated.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A compact spiraled slot antenna, comprising:

a slot with dimensions that are less than one quarter of an output wavelength, wherein the slot comprises of a plurality of lengths protruding in a plurality of planes; and an antenna compliment ring that includes an elongated portion and a flange, such that the compact spiraled slot antenna is capable of being fed directly from a printed circuit board (PCB).

2. The compact spiraled slot antenna of claim 1, wherein the slot is formed by coupling a plurality of components in a wireless device.

3. The compact spiraled slot antenna of claim 2, wherein a total effective length of the slot is about one quarter of the output wavelength.

4. The compact spiraled slot antenna of claim 2, wherein the slot comprises of an open end and a closed end.

5. The compact spiraled slot antenna of claim 2, wherein the slot is wide enough as to allow the compact spiraled slot antenna to have a wide bandwidth.

6. The compact spiraled slot antenna of claim 5, wherein the slot is adapted to have a frequency range of 5 GHz to 6 GHz, or 6 GHz-7 GHz for a new WiFi 6E band.

7. The compact spiraled slot antenna of claim 1, further comprising a secondary slot adapted to cover a different frequency and fed by the same mechanism as a primary antenna, thus broadening the bandwidth.

8. The compact spiraled slot antenna of claim 1, further comprising components mounted within the slot, such effects of having components mounted within the slot being compensated by adjusting dimensions of the slot and adjusting a location of a feeding point of the compact spiraled slot antenna.

9. The compact spiraled slot antenna of claim 1, wherein the antenna compliment ring further includes one or more air steps which are disposed in a ground plane and sized to a tune a length or width of the slot, thereby tuning of the compact spiraled slot antenna for a particular resonance.

10. A wireless device with one or more slot antennas, the wireless device comprising:

one or more heat spreaders comprising multiple cavities which form portions of the one or more slot antennas;

one or more printed circuit boards (PCBs) comprising a feeding mechanism and a plurality of via holes to allow electrical current to flow through the PCB;

an antenna compliment ring comprising portions of multiple antennas; and one or more compact spiraled slot antennas comprising a slot formed by coupling the one or more heat spreaders, the one or more printed circuit boards, and the antenna compliment ring, the combination of the one or more heat spreaders, the one or more PCBs and the antenna compliment ring creating the one or more compact spiraled slot antennas, the combination enabling current to flow around the slot of the one or more compact spiraled slot antennas and through the one or more PCBs to create an electric filed, such that the one or more spiraled slot antennas is configured to radiate.

11. The wireless device of claim 10, wherein a total effective length of the slot is about one quarter of the output wavelength.

* * * * *